United States Patent [19]

Archer

[11] Patent Number: 4,847,506

[45] Date of Patent: Jul. 11, 1989

[54] HARDENING OF SPACECRAFT STRUCTURES AGAINST MOMENTARY HIGH LEVEL RADIATION EXPOSURE USING A RADIATION SHIELD

[75] Inventor: John S. Archer, Rancho Palos Verdes, Calif.

[73] Assignee: TRW Inc., Redondo Beach, Calif.

[21] Appl. No.: 53,900

[22] Filed: May 26, 1987

[51] Int. Cl.$^4$ .............................................. B64G 1/54
[52] U.S. Cl. ............................... 250/515.1; 343/872; 343/873; 244/158 A; 244/173
[58] Field of Search ..................... 250/515.1; 343/872, 343/873; 244/158 A, 173

[56] References Cited

U.S. PATENT DOCUMENTS 4,148,962  4/1979  Leiser et al. ........................ 428/366
4,173,187 11/1979  Steverding ....................... 250/515.1

Primary Examiner—Bruce C. Anderson
Assistant Examiner—Jack I. Berman
Attorney, Agent, or Firm—Sol L. Goldstein

[57] ABSTRACT

Objects, particularly spacecraft structures, antennas, solar arrays and other spacecraft equipment, are shielded against damage from momentary exposure to high energy electromagnetic radiation in the form of high energy optical (laser) radiation or nuclear radiation by a radiation barrier or shield constructed of fibrous silica refractory composite material like that used for the heat shield tiles on the shuttle spacecraft.

11 Claims, 2 Drawing Sheets

HARDENING OF SPACECRAFT STRUCTURES AGAINST MOMENTARY HIGH LEVEL RADIATION EXPOSURE USING A RADIATION SHIELD

BACKGROUND OF THE INVENTION

1. Field of the Invention

This invention relates generally to the art of radiation hardening objects, particularly spacecraft structures and equipment, against damage from momentary exposure to high energy electromagnetic radiation in the form of high energy optical (laser) and nuclear radiation. The invention relates more particularly to radiation hardened structures and equipment and a radiation hardening method utilizing fibrous silica refractory composite material as a radiation barrier or shield.

2. Prior Art

As will appear from the ensuing description, the principles of this invention may be utilized to radiation harden virtually any object against damage from momentary exposure to high energy electromagnetic radiation. The invention is intended primarily for radiation hardening spacecraft against high energy optical radiation, that is high energy laser radiation, and will be described in this context.

High energy lasers are a weapon of the future, if not the present, which will have or now have the capability of seriously damaging if not totally destroying spacecraft. External spacecraft appendages, such as antennas and solar arrays are especially vulnerable to damage or destruction, by laser beams. A variety of radiation shielding techniques for this purpose have been devised. Among these are the following techniques for hardening parabolic antennas against optical radiation, that is laser beams.

Painting the parabolic antenna dish with highly reflective material. This hardening technique is effective only for low intensity laser beams.

Covering the entire antenna including the parabolic reflector dish and the antenna feed with a high energy radiation blanket-shield constructed of high temperature resistant cloth, such as that marketed under the trade mark Astro-Quartz. A cover of this kind having the required opacity to high energy optical radiation or laser beams is relatively heavy and, in addition, severely attenuates and distorts the RF signal transmitted from and received by the antenna.

Providing a laser beam opaque radome over the antenna. This radome has the same disadvantages as the astro-quartz shield above.

Constructing the antenna of high temperature resistant material, such as titanium. This would result in a very heavy antenna structure and high antenna fabrication costs.

The radiation hardening techniques devised for other spacecraft structures and equipment are similarly deficient. Accordingly, a definite need exists for an improved radiation hardening technique for spacecraft, spacecraft systems and equipment, and other objects susceptible to damage or destruction by high level optical and nuclear radiation.

SUMMARY OF THE INVENTION

This invention hardens an object against high energy electromagnetic radiation, such as high energy optical (laser) radiation and nuclear radiation, by shielding the object with a high radiation level shield constructed of shielding material similar to the heat shield material, commonly referred to as shuttle tile, used on the shuttle spacecraft to protect the spacecraft against the high re-entry temperatures.

More accurately described, the high energy radiation shielding material utilized in this invention is the fibrous silica refractory, composite material used for the heat shield tiles on the shuttle spacecraft. This material constitutes a re-radiative thermal protection medium which, when subjected to a momentary thermal pulse, is effective to dissipate the heat to the environment before transfer of the heat can occur by conduction through the material to its inner surface.

This invention utilizes five particular properties of the shielding material. These properties are:

(1) High absorbency and re-radiation property of the material for high energy electromagnetic radiation such as high energy optical or laser radiation and nuclear radiation.

(2) Ability of the material to maintain its structural integrity over an extreme temperature range from the extremely low temperatures encountered in outer space to the extremely high temperatures produced by illumination of the material by a pulse of such high energy electromagnetic radiation.

(3) Thermal lossiness of the material whereby the material can sustain a pulse of high energy electromagnetic radiation without sufficient heat conduction through the material to he object being shielded to damage the object and yet has sufficiently high thermal conductivity to perform as a moderately efficient thermal radiator for dissipating heat to the ambient environment in the absence of laser radiation.

(4) Low absorbency (high transparency) of the material for RF electromagnetic energy, whereby when used to shield an antenna, for example, the material does not significantly attenuate or distort incident RF energy passing through the material to and from the antenna.

(5) Low thermal expansion and low Young's modulus of the material to minimize buildup of thermal stresses between the shield and the supporting structure being protected, and low density for light weight.

According to this invention, the radiation shield is arranged in the most effective radiation shielding relation to the object to be projected so as to intercept and absorb high level radiation propagating toward the object. The precise arrangement of the shield will very from one shielding application to another.

One disclosed embodiment of the invention is a spacecraft parabolic dish antenna. The fibrous refractory composite material is bonded to the RF reflecting surface of the parabolic reflector or dish and is also applied over the aperature of the antenna feed. The composite material has the unique property that for the material thickness required for laser and nuclear radiation shielding, the material produces only very slight attenuation and distortion of the transmitted and/or received RF energy and far less than that produced by an Astro-Quartz blanket, for example. Thus, the present radiation hardening technique does not seriously degrade the antenna performance.

Another disclosed embodiment is a spacecraft solar array shielded by a layer of radiation shielding material bonded to the backside of the solar array substrate.

In each case, the radiation shielding material is designed to intercept and absorb incident high energy radiation without damage to the underlying protected surface, while the outer surface of the shielding material is intensely heated by a momentary pulse of high level laser or nuclear radiation. The high re-radiation property and thermal resistance of the material precludes sufficient heat conduction thru the material to damage the protected surface before the material cools by re-radiation to the ambient environment.

PREFERRED EMBODIMENT

Figure 1:
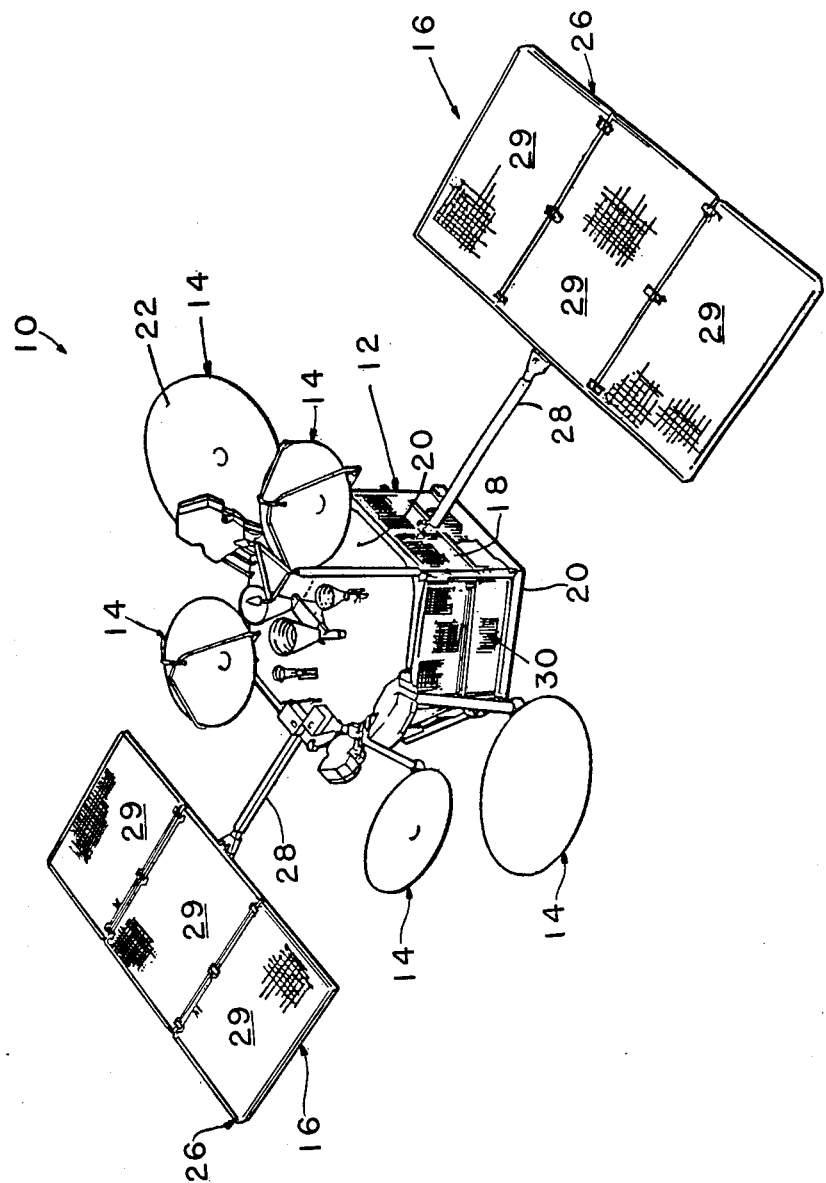
FIG. 1 illustrates a spacecraft having a parabolic antenna and a solar array radiation hardened in accordance with the present invention.

The spacecraft 10 illustrated in the drawings is conventional except for its high energy radiation shielding according to this invention. Accordingly, it is necessary to describe the spacecraft only in such detail as is necessary to a clear and complete understanding of this invention. It is important to mention at the outset, however, that the invention is not restricted to use on any particular spacecraft or, for that matter, to use on spacecraft. For example, the principles of the invention may be utilized to shield ground based objects against high energy radiation.

Accordingly, it will be understood that according to its broader aspects, the invention is concerned with shielding against high energy laser or nuclear radiation, any object which is susceptible to damage or destruction by such radiation. In the particular spacecraft application illustrated in the drawings, the shielded objects are the spacecraft body 12, parabolic antennas 14, and solar arrays 16.

With this preliminary discussion in mind, the illustrated spacecraft body 12 has a circumferential wall 18 and ends 20. The antennas 14 are mounted on one body end 20 and each includes a parabolic reflector dish 22 and an antenna feed 24 at the focus of the dish. Each solar array 16 comprises a solar panel assembly 26 mounted at the outer end of a supporting beam 28 extending outwardly from the spacecraft body 12 and comprising three hinged solar array panels 29. In an actual spacecraft, the antennas 14 and solar arrays 16 are folded to compact stowage configurations (not shown) during launch and are extended to their illustrated deployed positions upon arrival of the spacecraft in its intended operational orbit. The drawings illustrate the antennas and solar arrays in their deployed positions only.

Figure 2:
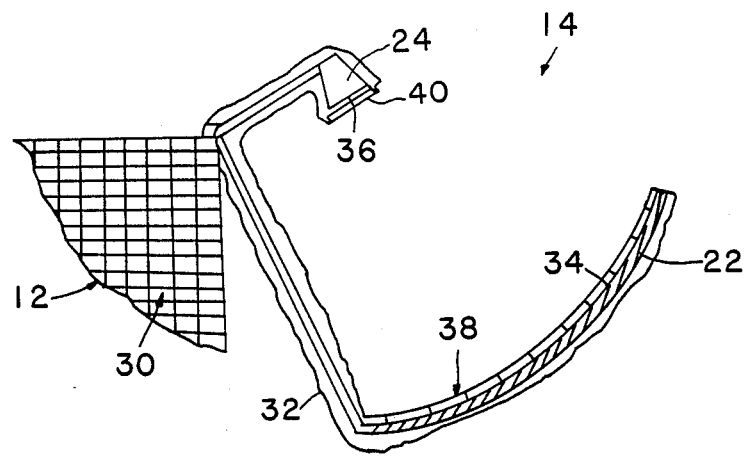
FIG. 2 is an enlarged section illustrating the radiation shielding for the spacecraft antenna.
Figure 3:
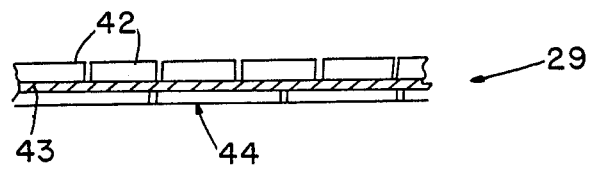
FIG. 3 is an enlarged section illustrating the radiation shielding for the spacecraft solar array.

The spacecraft body 12 is covered by high energy radiation shielding 30 applied to its circumferential wall 18. Each antenna 14 is covered by a radiation blanket or tent 32 (FIG.2), such as an Astro-Quartz blanket, except for the reflecting surface 34 of the antenna dish 22 and the aperture 36 of the antenna feed 24 which are exposed thru openings in the blanket. These Astro-Quartz blankets are omitted in FIG. 1 for simplicity of illustration. High energy radiation shielding 38, according to this invention, covers the exposed reflecting surface 34 of each antenna dish 22. High energy radiation shielding 40 covers its feed aperture 36. Each solar array panel 29 has solar cells 42 mounted on one side (the upper side in FIG. 1) of a substrate 42. The opposite or backside of the substrate is covered by high energy radiation shielding 44.

The radiation shielding 30, 38, 40 and 44 all comprise the fibrous silica refractory, composite material referred to earlier. Such material is manufactured by the Lockheed Company under various designations including FRCI 900, FRCI-12 LI-900 and LI 2200. This material constitutes a re-radiative thermal protection medium. When subjected to a momentary thermal pulse, such as a high energy laser radiation pulse or a nuclear radiation pulse, the material dissipates the resulting heat by re-radiation to the environment before sufficient thermal conduction can occur thru the material to damage the underlying protected surface.

This material is characterized by the five properties mentioned earlier. These properties are:

(1) High absorbency and re-radiation property of the material for high energy electromagnetic radiation such as high energy optical or laser radiation and nuclear radiation.

(2) Ability of the material to maintain its structural integrity over an extreme temperature range from the extremely low temperatures encountered in outer space to the extremely high temperatures produced by illumination of the material by a pulse of such high energy electromagnetic radiation.

(3) Thermal lossiness of the material whereby the material can sustain a pulse of high energy electromagnetic radiation without sufficient heat conduction through the material to the object being shielded to damage the object and yet has sufficiently high thermal conductivity to perform as a moderately efficient thermal radiator for dissipating heat to the ambient environment in the absence of laser radiation.

(4) Low absorbency (high transparency) of the material for RF electromagnetic energy, whereby when used to shield an antenna, for example, the material does not significantly attenuate or distort incident RF energy passing through the material to and from the antenna.

(5) Low thermal expansion and low Young's modulus of the material to minimize buildup of thermal stresses between the shield and the supporting structure being protected, and low density for light weight.

I claim:

1. In combination:

a spacecraft comprising a structure which is susceptible to damage by nomentary exposure to high energy radiation said structure being stowed during launch and deployed in space, and a high energy radiation shield secured to and disposed in radiation shielding relation to said structure for intercepting momentary high energy radiation propagating toward the structure, said shield comprising a shielding material which is relatively opaque to said intercepted radiation, and said material being momentarily heated by said intercepted radiation, said material reradiating most of the heat produced in the shield to the space environment prior to sufficient heat conduction through the shield to said structure, thereby preventing damage to the structure.

2. The combination of claim 1 wherein:

said structure comprises a spacecraft antenna operable within a given frequency range, and
said shielding material is relatively transparent to electromagnetic radiation within said given frequency range.

3. In combination:
a spacecraft antenna which (a) has an exposed surface, (b) is operable within a given frequency range, and (c) is susceptible to damage by momentary exposure of said surface to high energy radiation and
a high energy radiation shield disposed in radiation shielding relation to said antenna surface and comprising a shielding material which is secured to said antenna surface and is relatively transparent to electromagnetic radiation within said given frequency range.

4. The combination of claim 3 wherein:
said antenna includes an RF reflector having a surface which comprises said antenna surface, and
said shielding material is bonded to said surface.

5. The combination of claim 3 wherein:
said antenna comprises a parabolic dish antenna including a parabolic reflector having a parabolic surface comprising said antenna surface and a feed at the focus of said reflector having an aperture,
said shielding material is bonded to the parabolic surface and dispoed in front of said aperture, and
said shield further comprises other radiation shielding means covering the remainder of said antenna.

6. The combination of claim 1 wherein:
said spacecraft structure comprises a solar panel having solar cells on one side, and
said shield is disposed in radiation shielding relation to the opposite side of said solar panel.

7. The combination of claim 1 wherein said shielding material is of the fibrous silica refractory composite type.

8. The combination of claim 3 wherein said shielding material is of the fibrous silica refractory composite type.

9. In combination:
a solar array susceptible to damage by momentary exposure to high energy radiation and including a substrate and solar cells mounted on one side of said substrate, and
a high energy radiation shield disposed in radiation shielding reaction to said solar array comprising a shielding material bonded to the opposite side of said substrate.

10. The method of shielding a structure which is deployed from a spacecraft in space against momentary exposure to high energy radiation, comprising the steps of:
providing for said spacecraft structure a high energy radiation shield comprising a material which is relatively opaque to said momentary high energy radiation, which high energy radiation heats the shielding material, and said shield reradiating most of the heat produced to the space environment prior to sufficient heat conduction through the shield to damage said spacecraft structure, and
placing said shield relative to said spacecraft structure to intercept momentary high energy radiation propagating toward said structure.

11. The method of claim 10 wherein said shielding material is of the fibrous silica refractory composite type.

* * * * *